US009274762B2

(12) United States Patent
O'Brien

(10) Patent No.: US 9,274,762 B2
(45) Date of Patent: Mar. 1, 2016

(54) SYSTEM AND METHOD FOR DEVELOPING AN OBJECT-ORIENTED SYSTEM

(75) Inventor: Wayne P. O'Brien, Staunton, VA (US)

(73) Assignee: Raytheon Company, Waltham, MA (US)

( * ) Notice: Subject to any disclaimer, the term of this patent is extended or adjusted under 35 U.S.C. 154(b) by 1092 days.

(21) Appl. No.: 13/297,578

(22) Filed: Nov. 16, 2011

(65) Prior Publication Data

US 2013/0125088 A1 May 16, 2013

(51) Int. Cl.
*G06F 9/44* (2006.01)
(52) U.S. Cl.
CPC ... *G06F 8/35* (2013.01); *G06F 8/24* (2013.01)
(58) Field of Classification Search
CPC ..................................... G06F 8/35; G06F 8/24
USPC .................................................. 717/105, 108
See application file for complete search history.

(56) References Cited

U.S. PATENT DOCUMENTS

| 2002/0010909 | A1* | 1/2002 | Charisius et al. | 717/2 |
| 2003/0084423 | A1* | 5/2003 | Clegg et al. | 717/105 |
| 2005/0149868 | A1* | 7/2005 | Katayama et al. | 715/700 |
| 2007/0061758 | A1* | 3/2007 | Manson et al. | 715/853 |
| 2007/0288885 | A1* | 12/2007 | Brunel et al. | 717/104 |
| 2011/0167409 | A1* | 7/2011 | Schadow | 717/123 |
| 2011/0214104 | A1* | 9/2011 | Sharma et al. | 717/105 |
| 2012/0240099 | A1* | 9/2012 | Dangeville et al. | 717/105 |
| 2013/0013287 | A1* | 1/2013 | Takayama | 704/4 |

OTHER PUBLICATIONS

Kleppe et al., Making UML Activity Diagrams Object-Oriented, IEEE, 2000.*

* cited by examiner

*Primary Examiner* — Anna Deng
(74) *Attorney, Agent, or Firm* — Schwegman Lundberg & Woessner, P.A.

(57) ABSTRACT

A method for developing an object-oriented system includes receiving, at a computer, a request to transliterate a textual flow of events into an activity diagram and transliterating the textual flow of events into an activity diagram where the activity diagram comprising a plurality of actions and a plurality of objects. The plurality of actions are affinitized into a plurality of classes where each of the plurality of classes comprising at least one of the plurality of actions. The affinitized actions are defined for each of the plurality of classes as operations for each of the respective classes. One or more of the plurality of objects are defined as operations for one or more of the plurality of classes. A model is displayed representing the object-oriented system.

15 Claims, 2 Drawing Sheets

US 9,274,762 B2

SYSTEM AND METHOD FOR DEVELOPING AN OBJECT-ORIENTED SYSTEM

TECHNICAL FIELD OF THE INVENTION

This invention relates generally to the field of object-oriented technology and more particularly to a system and method for developing an object-oriented system.

BACKGROUND OF THE INVENTION

Designing an object-oriented system typically requires identifying one or more analysis classes. Known techniques for identifying analysis classes may involve a grammatical parsing process that is subjective and involves multiple steps. For example, in current practice, developers identify classes by grammatically parsing textual requirements in a system use case (i.e., a flow of events) for nouns and noun clauses. Once classes are identified, developers parse the flow of events to identify operations for each class by looking for verbs that relate to the nouns corresponding to the classes. Developers then parse the flow of events for items related to the nouns to identify the attributes of the classes. Each of these parsing steps may require some subjectivity. The subjectivity associated with some known techniques for developing object-oriented systems may be unsatisfactory in certain situations.

SUMMARY OF THE INVENTION

In accordance with the present invention, disadvantages and problems associated with previous techniques for designing computer programs may be reduced or eliminated.

According to one embodiment of the present invention. A method for developing an object-oriented system includes receiving, at a computer, a request to transliterate a textual flow of events into an activity diagram and transliterating the textual flow of events into an activity diagram where the activity diagram comprising a plurality of actions and a plurality of objects. The plurality of actions are affinitized into a plurality of classes where each of the plurality of classes comprising at least one of the plurality of actions. The affinitized actions are defined for each of the plurality of classes as operations for each of the respective classes. One or more of the plurality of objects are defined as operations for one or more of the plurality of classes. A model is displayed representing the object-oriented system.

Certain embodiments of the invention may provide one or more technical advantages. For example, one technical advantage is that starting with transliteration of textual requirements into an activity diagram provides a more precise basis for identifying classes than does parsing textual requirements. Another technical advantage is that developers can convert the activity diagram directly into classes with considerably more precision and less subjectivity than with parsing textual requirements into classes as the conversion is from one unified modeling language diagram to another using automated tools. Yet another technical advantage is that operations and attributes of the classes are identified in one transliteration step rather than three separate parsing steps.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
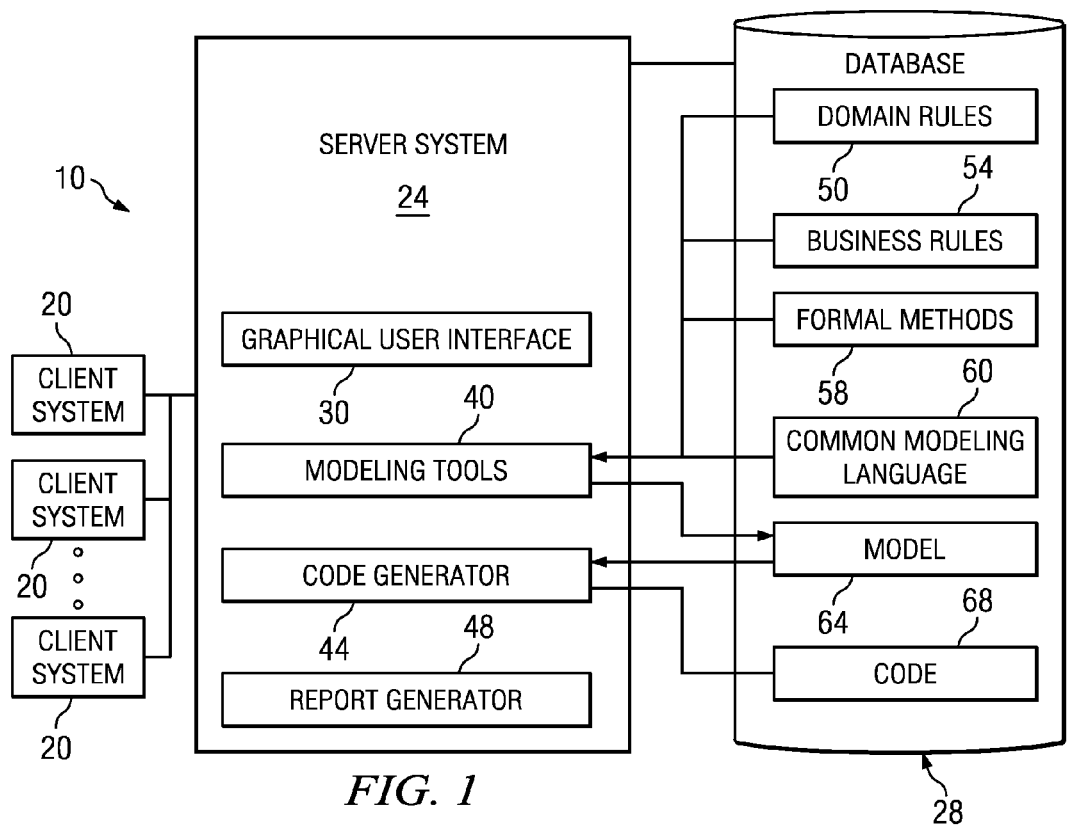
FIG. 1 is a block diagram illustrating one embodiment of a system for designing a computer program.
Figure 3:
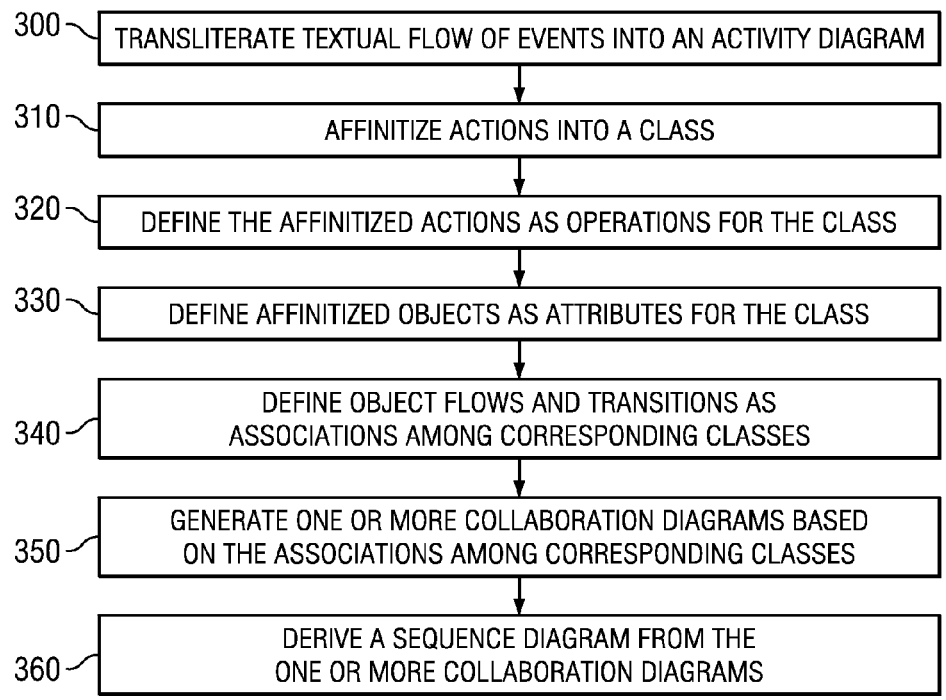
FIG. 3 is a flowchart illustrating one embodiment of a method for generating domain rules.
Figure 2:
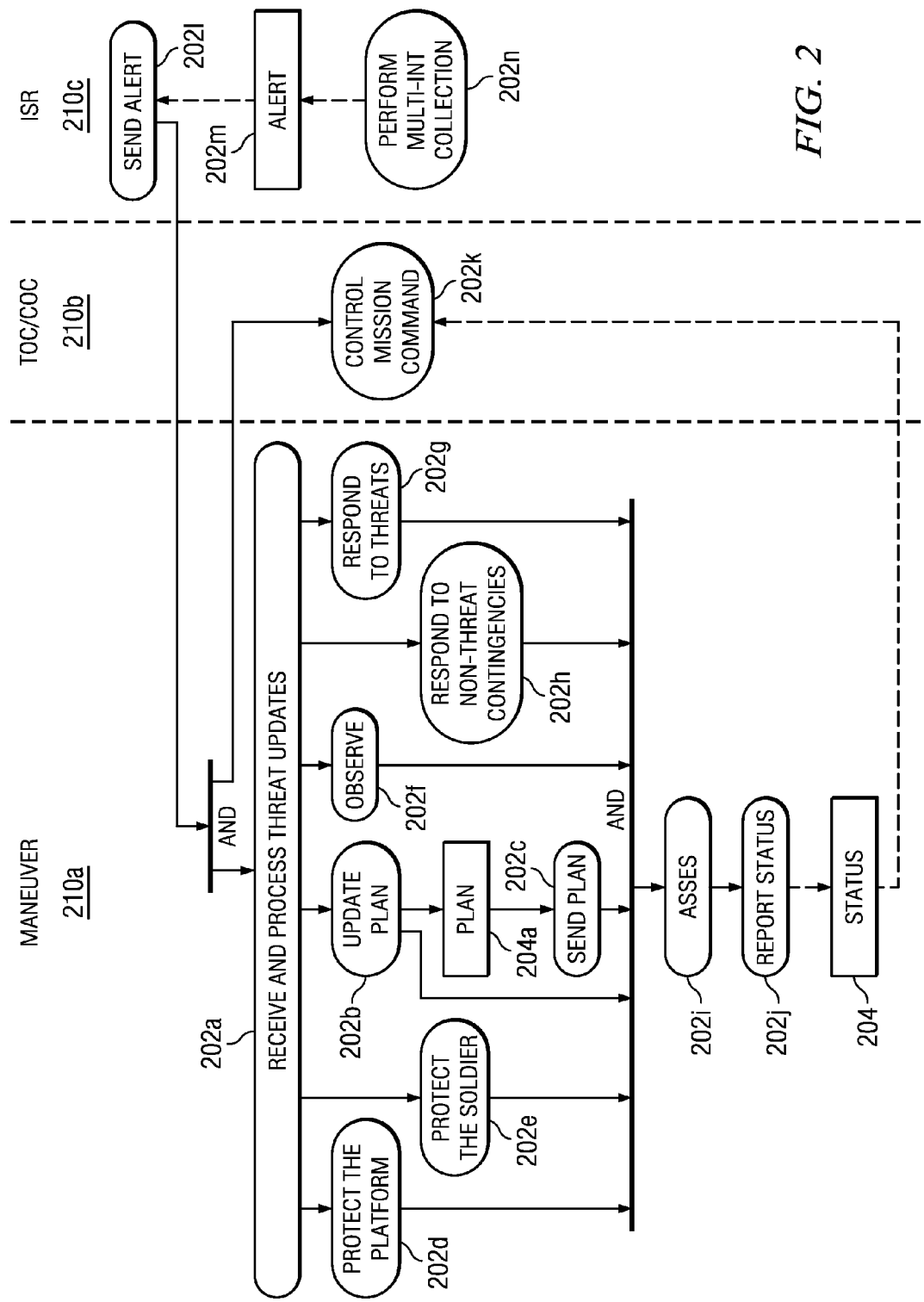
FIG. 2 is a flowchart illustrating one embodiment of a method for designing a computer program.

Embodiments of the present invention and its advantages are best understood by referring to FIGS. 1 through 3 of the drawings, like numerals being used for like and corresponding parts of the various drawings. As used in this document, "each" refers to each member of a set or each member of a subset of a set. It should be understood at the outset that, although example implementations of embodiments are illustrated below, the present invention may be implemented using any number of techniques, whether currently known or not. The present invention should in no way be limited to the example implementations, drawings, and techniques illustrated below.

For purposes of teaching and discussion, it is useful to provide some overview of background information that may be relevant to understanding the invention. The following foundational information may be viewed as a basis from which the present invention may be properly explained. Such information is offered earnestly for purposes of explanation only and, accordingly, should not be construed in any way to limit the broad scope of the present invention and its potential applications.

According to object-oriented technology, applications and computer programs may be viewed as a collection of discreet objects representing entities that are self-contained collections of data structures and routines that interact with other objects. Object-oriented programming involves both analysis and design. Object-oriented analysis identifies component objects and system requirements, and describes how the component objects and system requirements interact to perform specific tasks. Typically, analysis attempts to reuse existing solutions. Object-oriented design may involve creating a system in which the objects may be efficiently adapted to perform the tasks.

Design of object-oriented systems may be effected using a modeling language, such as the Unified Modeling Language (UML). When using a modeling language to develop object-oriented systems, developers may identify one or more analysis classes and their operations and attributes. Identification of classes is typically performed by grammatically parsing a textual flow of events of a use case. For purposes of UML, a use case represents a specification of sequences of actions, including variant sequences and error sequences, that a system, subsystem, or class can perform by interaction with outside objects to provide an observable result to a user. The described sequences in a use case may be recorded in structured textual documents as flows of events, which describe what a system must do, or how a system must operate, to fulfill specified requirements.

To identify classes, developers may parse the flow of events (or the use case) for nouns and noun objects, which may be identified as classes. Once classes are identified, developers may re-parse the flow of events (or the use case) for one or more verbs associated with a noun or noun-object identified as a class. The identified verbs may be designated as operations for the class. After classes are identified, developers may also re-parse the flow of events (or the use case) for items related to the nouns to identify the attributes of the classes.

FIG. 1 is a block diagram illustrating one embodiment of a system 10 for developing object-oriented systems. Embodiments of system 10 may assist in the development of object-oriented systems by supporting the preparation of transliterated activity diagrams, which may provide efficient tools for identifying analysis classes and their operations and attributes. Embodiments of system 10 may also prepare collaboration and sequence diagrams, as well as code comprising a computer program represented by the object-oriented system. It should be noted that for purposes of this specification a computer program may be an example of an object-oriented system.

System 10 may include one or more client systems 20, a server system 24, and a database 28 coupled as shown in FIG. 1. A client system 20 allows a user to communicate with server system 24 to develop an object-oriented system. Users of client system 20 may include designers, stakeholders, or any other person or identifier identifying a person. Stakeholders may include engineers from any of a number of fields such as the network, hardware, software, human factors, or database fields.

Server system generally 24 manages applications for designing object-oriented systems, such as a graphical user interface 30, modeling tools 40, a code generator 44, and a report generator 48. Users of client interface may access applications of server system 24 via graphical user interface 30.

Database 28 stores data that may be used by server system 24. Database 28 may generally represent any suitable data storage medium, such as, for example an object oriented database or a relational database. Database 28 may include, for example, domain rules 50, business rules 54, formal methods 58, a common modeling language 60, a model 64, and code 68.

Modeling tools 40 may generate model 64 that represents an object-oriented system under design. Model 64 may include, for example, nodes representing objects with operations performed by the system and branches representing relations among the objects. Modeling tools 40 may comprise, for example, modeling tools provided by RATIONAL SOFTWARE such as RATIONAL ROSE REAL-TIME (RRT) modeling and code generation tool. Modeling tools 40 may also include tools that deal with requirements management, configuration management, testing, performance optimization, and documentation.

In some embodiments, model 64 may be actively linked to code 68 such that modeling tools 40 may provide dynamic views of model 64 to aid in the design of the object-oriented system. Different models 64 may present different views of the object-oriented system. Models 64 may include, for example, a domain model that establishes the context of the system, a business model that establishes an abstraction of an organization associated with the system, a use case model that establishes the programs functional and non-functional requirements, and an activity model, such as an activity diagram, that establishes a conceptual design of the system. The models may be actively linked with each other to reflect aspects of each other. For example, a domain model may be actively linked with a lower-level model, such that the lower-level model requirements reflect the requirements of the domain model. In this manner system may automatically provide traceability between an event and its corresponding requirements.

In operation, modeling tools 40 may use domain rules 50, business rules 54, and formal methods 58, which may be expressed according to common modeling language 60, to generate model 64. In some embodiments, code generator 44 may generate code 68 according to model 64. Code 68 may include code that executes a computer program represented by model 64. Embodiments of code generator 44 may also operate to check code 68 and model 64 for syntax compliance and for consistency. Report generator may be used to generate a report describing the object-oriented system.

Domain rules 50 comprise invariant rules that define a domain that may be used to determine a problem space and a solution space. A substantially complete set of domain rules may anticipate substantially all possible applications of the domain, and may provide a framework from which substantially all solutions of the solution space may be generated. Domain rules 50 may be selected according to any suitable procedure to generate any suitable problem space, and may be generated through successive iterations other design process.

Business rules 54 comprise rules that may be customized to fit a particular application. Business rules may include, for example, rules of engagement, mission plans, or resource management rules. While domain rules 50 may be invariant, business rules 54 may be customizable. As an example, domain rules may comprise the principles of war, while business rules 43 may comprise the rules of engagement. Further examples of domain rules and business rules are provided in U.S. patent application Ser. No. 10/621,772 titled "Designing Computer Programs."

Formal methods 58 may be expressed according to common modeling language 60, which provides for a common representation for data used by system 10. Common modeling language 60 may comprise, for example, the Unified Modeling Language (UML) supported by OBJECT MANAGEMENT GROUP.

Common modeling language 60 may be used to represent artifacts of the program design from semantic broadly-stated requirements through syntactic operating or executing components, and may be used to express artifacts from various stages of program design. Stages may include the early stages of design, for example, a request to automate an operation or to change an existing automated system, which are typically expressed as narrative descriptions. Subsequent phases such as concept exploration and definition, requirements analysis, program design and verification, and software coding and testing may also be expressed using common modeling language 60. Common modeling language 60 provides for artifacts that are understandable to users at any stage of design. Accordingly, users may determine whether the requirements have been captured by the program, and inconsistencies between stages may be more effectively resolved.

According to the illustrated embodiment, client systems 20 may allow one or more users to concurrently design an activity diagram for an object-oriented system. Users of client systems 20 may access graphical user interface 30 to access applications of server system 24. In some embodiments, the described applications of server system 24 may support the generation of an activity diagram. As discussed, an activity diagram may generally be a graphical representation of a flow of events described in a system use case.

FIG. 2 is an example activity diagram 200 that may be generated by server system 24. Activity diagram 200 may be representative of a model 64 described with respect to system 10. Activity diagram 200 may generally provide a graphical representation of the flow of control and data from action to action in an object-oriented system. In the illustrated embodiment, activity diagram comprises a plurality of actions 202 and a plurality of objects 204. Arrows 206 may generally represent a flow of control from one action 202 to another action 202. Dashed arrows 208 generally represent the flow of data from an action 202 to an object 204, or from an object 204 to an action 202. Arrows 206 and dashed arrows 208 may be used to identify collaborations among classes.

A user at a client system 10 may manipulate modeling tools 40 of server system 20 to generate activity diagram 200. In certain embodiments, activity diagram 200 may comprise a direct transliteration of textual requirements of the flow of events described in a system use case. For example, if the first requirement in a flow of events is "Receive and Process Threat Updates (Alerts from ISR), an action 202a titled "Receive and Process Threat Update." As another example, if a subsequent requirement in a flow of events is "Update Plan," an action 202b titled "Update Plan" may be created in activity diagram 200. Because "Update Plan" action 202b may require the flow of data from one action to another action (i.e., from "Update Plan" action 202b to Send Plan" action 202c), an object 204a may be created to indicate the flow of data.

From activity diagram 200, modeling tools 40 may identify analysis classes, which may be used to generate collaboration and sequence diagrams. Analysis Classes may be identified by affinitizing activities 202 within a swim lane 210. A swim lane 210 may generally be a vertical partition of activity diagram 200. An analysis class may comprise the collection of actions 202 within a particular swim lane 210. Accordingly, actions 202a-202j within swim lane 210a may be designated as an analysis class. The attributes for a class may comprise the objects 204 within a swim lane 210. The operations for a class may comprise the affinitized actions 202 within a swim lane 210.

Identifying analysis classes from an activity diagram comprising a transliteration of textual requirements from a flow of events may be particularly efficient and precise. For example, developers may convert an activity diagram directly into classes using automated tools that affinitize actions into a swim lane. Moreover, operations and attributes for classes may be automatically identified by the actions and objects within a swim lane. Accordingly, developers may avoid grammatically parsing a written use case to identify classes as well as the attributes and operations for the respective classes. Additionally, users and subject matter experts (SMEs) without specialized engineering knowledge can review the textual requirements and activity diagram for accuracy against their own textual descriptions.

Client system 20 and server system 24 may each operate on one or more computers and may include appropriate input devices, output devices, mass storage media, processors, memory, or other components for receiving, processing, storing, and communicating information according to the operation of system 10. As used in this document, the term "computer" refers to any suitable device operable to accept input, process the input according to predefined rules, and produce output, for example, a personal computer, work station, network computer, wireless telephone, personal digital assistant, one or more microprocessors within these or other devices, or any other suitable processing device.

Client system 20 and server system 24 may be integrated or separated according to particular needs. For example, the present invention contemplates the functions of both client system 20 and server system 24 being provided using a single computer system, for example, a single personal computer. If client system 20 and server system 24 are separate, client system 20 may be coupled to server system 24 using one or more local area networks (LANs), metropolitan area networks (MANS), wide area networks (WANs), a global computer network such as the Internet, or any other appropriate wire line, wireless, or other links.

Database 28 may be local to or remote from server system 24, and may be coupled to server system 24 using one or more local area networks (LANs), metropolitan area networks (MANS), wide area networks (WANs), a global computer network such as the Internet, or any other appropriate wire line, wireless, or other links. Artifacts of database 28 may be actively linked in order to allow for more efficient generation of products from the artifacts. The active links may be used to integrate analysis, design, and implementation of computer programs.

Modifications, additions, or omissions may be made to the system illustrated in FIG. 1 without departing from the scope of the invention. Moreover, the operation of the system may be performed by more or fewer modules. For example, the operation of modeling tools 40 and code generator 44 may be performed by one module, or the operation of modeling tools 40 may be performed by more than one module. Additionally, functions may be performed using any suitable logic comprising software, hardware, other logic, or any suitable combination of the preceding.

FIG. 3 is a flowchart illustrating one embodiment of a method for developing an object-oriented system. The method begins at step 300 where a textual flow of events for a system is transliterated into an activity diagram. As described, transliteration may include copying one or more phrases directly from the textual flow of events into an activity diagram. Step 300 may be performed by, for example, modeling tools 40.

At step 310, one or more actions may be affinitized into a class. The one or more activities that are affinitized may be actions within a common swim lane of the activity diagram. At step 320, the affinitized actions may be defined as operations for the corresponding class. Similarly, at step 330, the affinitized objects may be defined as attributes of the corresponding class. Steps 310-330 may be performed by modeling tools 40.

Next, at step 340, object flows and transitions may be defined as the associations among corresponding classes. Using the associations among corresponding classes, a collaboration diagram may be generated at step 350. A collaboration diagram may generally indicate relationships between classes, including classes that may not be included in the current activity diagram, but may be associated with the current activity diagram by virtue of being part of a common use case. Steps 340 and 350 may be performed by modeling tools 40. Finally, at step 360, a sequence diagram may be derived from the collaboration diagrams. The sequence diagram may generally comprise a time-ordered interaction among classes.

One skilled in the art will readily recognize that some of the steps illustrated in FIG. 3 may be combined, modified or deleted where appropriate, and additional steps may also be added to the flowchart. Additionally, steps may be performed in any suitable order without departing from the intended scope of the invention.

Further, while the present invention has been described in detail with reference to particular embodiments, it should be understood that various other changes, substitutions, and alterations may be made hereto without departing from the spirit and scope of the present invention. Numerous other changes, substitutions, variations, and modifications may be ascertained by those skilled in the art and it is intended that the present invention encompass all such changes, substitutions, variations, and modifications as falling within the spirit and scope of the appended claims.

What is claimed is:

1. A method for developing an object-oriented system comprising:

receiving, at a computer, a request to transliterate a textual flow of events into an activity diagram;

transliterating the textual flow of events into an activity diagram, the activity diagram comprising a plurality of actions and a plurality of objects within a common swim lane;

affinitizing the plurality of actions within the common swim lane into a plurality of classes, each of the plurality of classes comprising at least one of the plurality of actions;

automatically defining the affinitized actions as operations for each of the plurality classes respectively;

automatically defining one or more of the plurality of objects within the common swim lane as attributes for one or more of the plurality of classes, wherein at least one of the one or more of the plurality of objects is created based on a relationship between a first action and a second action, the at least one object indicating a flow of data between the first action and the second action; and displaying a model representing the object-oriented system.

2. The method of claim 1, further comprising generating a collaboration diagram based on the associations among one or more of the plurality of classes.

3. The method of claim 1, further comprising deriving a sequence diagram from the collaboration diagram.

4. The method of claim 1, wherein transliterating a textual flow of events comprises copying one or more phrases directly from a textual flow of events into an activity diagram.

5. The method of claim 1, further comprising generating a code corresponding to the model.

6. A non-transitory, computer readable medium comprising software for caching network traffic, the software comprising computer code such that when executed is operable to:

transliterate a textual flow of events into an activity diagram the activity diagram comprising a plurality of actions and a plurality of objects within a common swim lane;

affinitize the plurality of actions within the common swim lane into a plurality of classes, each of the plurality of classes comprising at least one of the plurality of actions;

automatically define the affinitized actions as operations for each of the plurality classes respectively; and automatically define one or more of the plurality of objects within the common swim lane as attributes for one or more of the plurality of classes, wherein at least one of the one or more of the plurality of objects is created based on a relationship between a first action and a second action, the at least one object indicating a flow of data between the first action and the second action.

7. The non-transitory, computer readable medium of claim 6, wherein the code is further operable to generate a collaboration diagram based on the associations among one or more of the plurality of classes.

8. The non-transitory, computer readable medium of claim 6, wherein the code is further operable to derive a sequence diagram from the collaboration diagram.

9. The non-transitory, computer readable medium of claim 6, wherein code operable to transliterate a textual flow of events comprises code operable to copy one or more phrases directly from a textual flow of events into an activity diagram.

10. The non-transitory, computer readable medium of claim 6, wherein the code is further operable to retrieve one or more domain rules from a database.

11. The non-transitory, computer readable medium of claim 6, wherein the code is further operable to generate a code corresponding to a model of the object-oriented system.

12. A system for developing an object-oriented system comprising:

a database comprising a plurality of rules; and a server coupled to the database and operable to:

transliterate a textual flow of events into an activity diagram, the activity diagram comprising a plurality of actions and a plurality of objects within a common swim lane;

affinitize the plurality of actions within the common swim lane into a plurality of classes, each of the plurality of classes comprising at least one of the plurality of actions;

automatically define the affinitized actions as operations for each of the plurality classes respectively; and automatically define one or more of the plurality of objects within the common swim lane as attributes for one or more of the plurality of classes, wherein at least one of the one or more of the plurality of objects is created based on a relationship between a first action and a second action, the at least one object indicating a flow of data between the first action and the second action.

13. The system of claim 12, wherein the server is further operable to generate a collaboration diagram based on the associations among one or more of the plurality of classes.

14. The system of claim 12, wherein the server is further operable to derive a sequence diagram from the collaboration diagram.

15. The system of claim 12, wherein a server operable to transliterate a textual flow of events comprises a server operable to copy one or more phrases directly from a textual flow of events into an activity diagram.

* * * * *